(12) United States Patent  
Bryant

(10) Patent No.: US 10,543,704 B2  
(45) Date of Patent: Jan. 28, 2020

(54) PARTICLE-CODED CONTAINER

(71) Applicant: Owens-Brockway Glass Container Inc., Perrysburg, OH (US)

(72) Inventor: Jessica Rose Bryant, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1587 days.

(21) Appl. No.: 13/666,447

(22) Filed: Nov. 1, 2012

(65) Prior Publication Data

US 2014/0116911 A1  May 1, 2014

(51) Int. Cl.
  C03C 17/00 (2006.01)
  B41M 1/34 (2006.01)
  B41M 3/14 (2006.01)

(52) U.S. Cl.
  CPC ............ *B41M 1/34* (2013.01); *C03C 17/005* (2013.01); *C03C 17/007* (2013.01); *B41M 3/14* (2013.01); *C03C 2217/42* (2013.01)

(58) Field of Classification Search
  CPC . C03B 2201/01; C03C 17/04; C03C 2204/08; B41M 1/34
  USPC .................................. 65/93, 17.3, 33.6, 102
  See application file for complete search history.

(56) References Cited

U.S. PATENT DOCUMENTS

| | | | | |
|---|---|---|---|---|
| 3,300,289 A | * | 1/1967 | Long | 65/22 |
| 3,361,550 A | * | 1/1968 | Murphy et al. | 65/22 |
| 3,502,022 A | | 3/1970 | Wood | |
| 3,607,170 A | * | 9/1971 | Malesak | 65/22 |
| 3,951,633 A | * | 4/1976 | Danihel | 65/23 |
| 4,127,689 A | * | 11/1978 | Holt | 428/38 |
| 4,323,423 A | * | 4/1982 | Schrunk | 216/31 |
| 4,371,387 A | * | 2/1983 | Scholes | C03B 9/385 65/118 |
| 4,436,776 A | * | 3/1984 | Wojcik | 428/14 |
| 4,619,850 A | * | 10/1986 | Charlton | 428/38 |
| 4,740,401 A | * | 4/1988 | Barkhau et al. | 428/34.6 |
| 6,099,905 A | * | 8/2000 | Roquette | 427/279 |
| 6,372,327 B1 | * | 4/2002 | Burnham et al. | 428/156 |
| 6,378,906 B1 | | 4/2002 | Pennaz | |
| 6,796,146 B2 | * | 9/2004 | Burnham | 65/93 |
| 6,997,018 B2 | * | 2/2006 | Sakoske et al. | 65/60.2 |
| 7,055,691 B2 | | 6/2006 | Safian | |
| 8,021,739 B2 | * | 9/2011 | Nedelec | 428/166 |
| 8,196,807 B2 | * | 6/2012 | Grimard | 235/375 |
| 8,245,538 B2 | * | 8/2012 | Kimura et al. | 65/93 |
| 8,464,558 B2 | * | 6/2013 | Abensour et al. | 65/482 |
| 2002/0102388 A1 | * | 8/2002 | Burnham | 428/156 |
| 2003/0037569 A1 | * | 2/2003 | Arbab et al. | 65/22 |
| 2003/0044582 A1 | * | 3/2003 | Sakoske | B41M 1/12 428/195.1 |

(Continued)

FOREIGN PATENT DOCUMENTS

JP        2007055150 A    3/2007

OTHER PUBLICATIONS

Kondo, JP2007055150 machine translation as provided by: http://dossier1.ipdl.inpit.go.jp/AIPN/odse_call_transl.ipdl?N0000=7413&N0005=Ei7BzenZVnBvfz7D1ZIK&N0120=01&N2001=2&N3001=2007-055150&Ntt3=chemistryV14&Ntt4=productsV14&Ntt5=physicalV14&Ntt6=&Ntt7=&Ntt8=&Ntt9=&Ntt10=&Ntt11=&Ntt12=.*

(Continued)

*Primary Examiner* — Jodi C Franklin

(57) ABSTRACT

A method of coding containers including applying particles to the containers so that the particles bonds with the containers to form unique optically readable patterns.

29 Claims, 1 Drawing Sheet

(56) References Cited

U.S. PATENT DOCUMENTS

| | | | |
|---|---|---|---|
| 2004/0237590 A1* | 12/2004 | Sakoske | C03B 18/14 |
| | | | 65/60.5 |
| 2005/0211789 A1* | 9/2005 | Hsieh et al. | 235/494 |
| 2005/0218126 A1* | 10/2005 | Leyvraz | 219/121.69 |
| 2007/0038464 A1* | 2/2007 | Sato et al. | 705/1 |
| 2008/0055348 A1* | 3/2008 | Deeter et al. | 347/9 |
| 2008/0057266 A1* | 3/2008 | Johnson et al. | 428/116 |
| 2008/0090034 A1* | 4/2008 | Harrison et al. | 428/32.71 |
| 2008/0290082 A1* | 11/2008 | Tallet et al. | 219/452.11 |
| 2010/0046825 A1* | 2/2010 | Haushalter | B29C 45/372 |
| | | | 382/141 |
| 2010/0101275 A1* | 4/2010 | Abensour et al. | 65/32.3 |
| 2010/0107692 A1* | 5/2010 | Han | 65/21.4 |
| 2010/0255603 A9* | 10/2010 | Putnam et al. | 436/174 |

OTHER PUBLICATIONS

Ardagh Produces Unique Bottles for Absolut, Ardagh Group, Sep. 28, 2012, 1 page.

PCT Search Report and Written Opinion, Serial No. PCT/US2013/063203, Filed: Oct. 3, 2013, Applicant: Owens-Brockway Glass Container Inc., dated Dec. 3, 2013.

Database WPI, Week 200725, Thomson Scientific, London, GB; AN 2007-247466 XP002716719.

Canadian Office Action, Applicaton No. 2,883,254, Title: Particle-Coded Container, Owner: Owens-Brockway Glass Container Inc., dated Oct. 5, 2018.

Canadian Office Action, Application No. 2,883,254, Owner: Owens-Brockway Glass Cointainer Inc., Title: Particle Coded Container, dated Feb. 21, 2018.

* cited by examiner

PARTICLE-CODED CONTAINER

The present disclosure is directed to containers, methods of manufacturing containers, and to methods of marking containers.

BACKGROUND AND SUMMARY OF THE DISCLOSURE

A general object of the present disclosure, in accordance with one aspect of the disclosure, is to provide a container with an optically readable particle pattern to provide an attractive marker that is resistant to tampering therewith, for tracking, anti-counterfeiting, or other purposes.

The present disclosure embodies a number of aspects that can be implemented separately from or in combination with each other.

A method of manufacturing glass containers in accordance with one aspect of the present disclosure includes producing a glass melt, forming glass containers from the glass melt, coding the glass containers by applying particles to the glass containers so that the particles bond with the containers to form unique optically readable patterns, and annealing the glass containers.

In accordance with another aspect of the disclosure, there is provided a method of marking a container for tracking or other purposes, which includes the step of introducing particles onto a wall surface of the container while the container wall is hot so that the particles bond with the container wall to form a readable random pattern.

In accordance with a further aspect of the disclosure, a particle-coded container includes a body extending from a base, a shoulder extending from the body, and particles of various shapes and sizes in a random pattern carried by at least one of the base, body, shoulder, or neck.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION OF PREFERRED EMBODIMENTS

Figure 1:
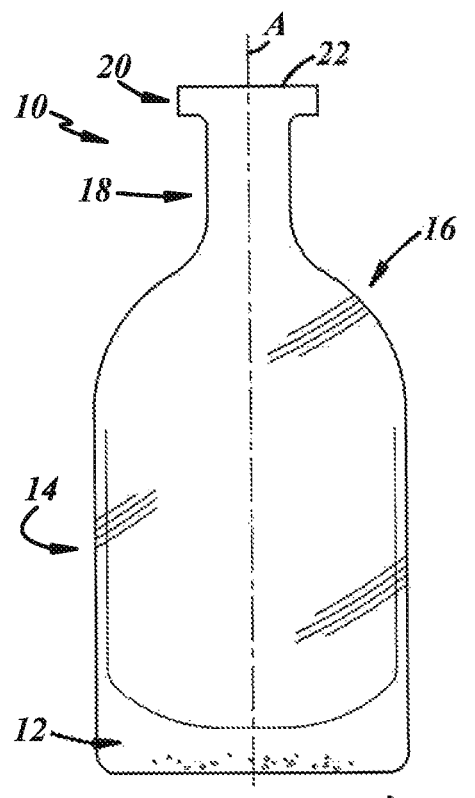
FIG. 1 is an elevational view of a container manufactured to include a pattern in accordance with an illustrative embodiment of the present disclosure.

FIG. 1 illustrates an illustrative embodiment of a container 10 (e.g., bottle, jar, jug, or the like) including a particle pattern 12 that may be applied to the container 10 as a random pattern and used as a unique code for the container 10, as will be discussed in further detail herein below. The container 10 may be composed of plastic or glass and, more particularly, may have a glass container composition that may be produced in accordance with illustrative embodiments of a glass manufacturing process presently disclosed herein below. The container 10 includes a longitudinal axis A, a base 13 at one axial end of the container 10 that is closed in an axial direction, a body 14 extending in an axial direction from the axially closed base 13, a shoulder 16 extending axially and radially from the body 14, and a neck 18 extending axially from the shoulder 16 and including a finish 20 and an open mouth 22 at another axial end of the container 10 opposite of the base 13. The term radial includes oriented generally along a radial line with respect to the longitudinal axis of the container and may include but is not limited to a direction that is strictly perpendicular to the container longitudinal central axis A. The body 14 may be of any suitable shape in cross-section transverse to the axis A as long as the body 14 is circumferentially closed. For example, the body 14 may be of cylindrical transverse cross-sectional shape that is circumferentially closed. In other embodiments, the body 14 may be generally oval, square, rectangular, triangular, or of any other suitable transverse cross-sectional shape. As used herein, the term circumferentially applies not only to circular transverse cross-sectional shapes but also applies to any closed transverse cross-sectional shape.

The container 10 may be of one-piece integrally formed construction, preferably glass or plastic construction. (The term "integrally formed construction" does not exclude one-piece integrally molded layered glass constructions of the type disclosed for example in U.S. Pat. No. 4,740,401, or one-piece glass bottles to which other structure is added after the bottle-forming operation.) In one embodiment, the container 10 may be fabricated in press-and-blow or blow-and-blow glass container manufacturing operations. The container 10 may be of any suitable shape, and may include a jug, jar, bottle, other food or beverage container, or any other suitable container. As used herein, the term axial includes oriented generally along a longitudinal axis of the closure, container, or package and may include but is not limited to a direction that is strictly parallel to a container longitudinal central axis A.

Referring to FIG. 1, the container base 13 includes a wall having the particle pattern 12, which is integrated to the container 10 and optically readable. In any event, each of a plurality of containers may be provided with its own unique pattern so as to code each container. The particle pattern may be composed of particles of any suitable size, shape, color, configuration, or material. For example, the particles may be of identical shape, or may have different shapes. Likewise, the particles may be of identical size, or may be of different sizes. In another example, the particles may be of only one color, or may be of only two different colors, or any other suitable quantity of different colors. In one embodiment, the particles may be composed of the same material as the containers. For example, the particles may be glass frit composed of soda-lime-silicate, borosilicate, or any other suitable glass material(s). In other embodiments, the particles may be composed of metal, ceramic, or any other suitable material. In any event, the particles may be applied to the container 10 in a solid phase, for example, as flakes, aggregate, powder, or according to any other suitable structure.

Figure 2:
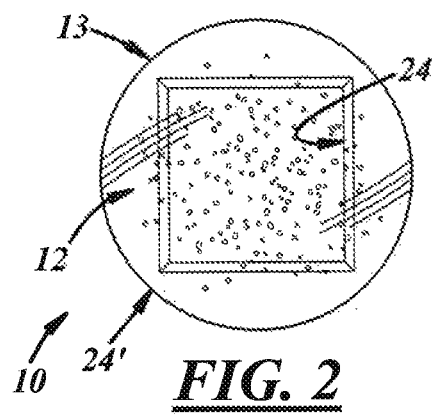
FIG. 2 is a bottom view of the container of FIG. 1.

As shown in FIG. 2, the container 10 also may include a code reference feature 24, which may include one or more geometric shapes or outlines in a corresponding wall of the container 10. The code reference feature 24 may include one or more embossments or debossments in the container wall. In the embodiment illustrated in FIG. 2, the reference feature 24 is square, and the circular base wall is the particles-bearing and reference feature-bearing wall of the container 10. In another embodiment illustrated in FIG. 2, a reference feature 24' may include an outer profile of the container 10, for example, a radially outer perimeter of the base 13 of the container 10. But, in other embodiments, the particle-bearing and reference feature-bearing container wall may be of any other suitable shape, and also or instead may be on the body, the shoulder, and/or the neck.

Figure 3:
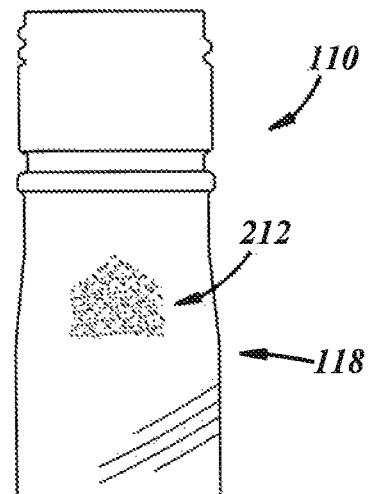
FIG. 3 is a fragmentary elevational view of a container manufactured to include particle patterns in accordance with another illustrative embodiment of the present disclosure.

For example, and with reference to FIG. 3, a container 110 includes a body 114, a shoulder 116 extending from the body, a circular code reference feature 124 in the container wall of the body 114 and the shoulder 116, and a particle pattern 112 in the container wall within the feature 124. In another embodiment illustrated in FIG. 3, a particle pattern 212 has an integral reference feature, namely, the outer profile of the particle pattern 212 itself. For example, the particle pattern 212 may be unidirectional, for instance, pentagon shaped like a baseball home plate, to reduce noise in reading the random pattern 212 with respect to the reference feature.

The particle patterns 12, 112, 212 and/or the reference features 24, 24', 124 may be non-removable, for purposes of tamper-evidence. The terminology "non-removable" includes a manner in which the particle patterns 12, 112, 212 and/or the reference features 24, 24', 124, are by design-intent, not intended to be removed from the container 10 without damaging the container 10 and/or the particle patterns 12, 112, 212 and/or the reference features 24, 24', 124, or otherwise visibly compromising the structural and/or functional integrity of either or both.

In production, and generally speaking, typical glass container manufacturing includes a "hot end" and a "cold end." The hot end may include one or more glass melting furnaces to produce a glass melt, one or more forming machines to form the glass melt into glass containers, and one or more applicators to apply a hot-end coating to the glass containers. The "hot end" also may include an annealing lehr, or at least a beginning portion of the annealing lehr, for annealing the glass containers therein. Through the lehr, the temperature may be brought down gradually to a downstream portion, cool end, or exit of the lehr. The "cold end" may include an end portion of the annealing lehr, applicators to apply one or more cold-end coatings to the glass containers downstream of the annealing lehr, inspection equipment to inspect the containers, and packaging machines to package the containers.

In conjunction with the above description, the containers 10, 110 may be produced by the following glass container manufacturing process, which may or may not include all of the disclosed steps or be sequentially processed or processed in the particular sequence discussed, and the presently disclosed manufacturing process and marking methods encompass any sequencing, overlap, or parallel processing of such steps.

First, a batch of glass-forming materials may be melted. For example, a melting furnace may include a tank with melters to melt soda-lime-silica to produce molten glass. Thereafter, the molten glass may flow from the tank, through a throat, and to a refiner at the downstream end of the furnace where the molten glass may be conditioned. From the furnace, the molten glass may be directed toward a downstream forehearth that may include a cooling zone, a conditioning zone, and a downstream end in communication with a gob feeder. The feeder may measure out gobs of glass and deliver them to a glass container forming operation.

Next, the glass gobs may be formed into containers, for example, by forming machines, which may include press-and-blow or blow-and-blow individual section machines, or any other suitable forming equipment. Blank molds may receive the glass gobs from the feeder and form parisons or blanks, which may be at a temperature, for example, on the order of 900-1100 degrees Celsius. Blow molds may receive the blanks from the blank molds and form the blanks into glass containers, which may be at a temperature, for example, on the order of 700-900 degrees Celsius. Material handling equipment may remove the glass containers from the forming machines and place the containers on conveyors or the like.

Also, the formed glass containers may be annealed, for example, by an annealing lehr. At an entry, hot end, or upstream portion of the annealing lehr, the temperature therein may be, for instance, on the order of 500-700 degrees Celsius. Through the lehr, the temperature may be brought down gradually to a downstream portion, cool end, or exit of the lehr, to a temperature therein, for example, on the order of 65-130 degrees Celsius.

At any suitable point(s) in the manufacturing process, particle code reference feature(s) may be provided on the containers. For example, the forming step may include forming the reference features on the glass containers, for example, using any suitable corresponding features in the mold(s). In another example, the reference features may be machined, laser etched, or otherwise cut into the containers. In a further example, the reference features may be applied to the containers by applied ceramic labeling (ACL), wherein the reference features may include screen printed or applied ceramic lines, shapes, or the like. For ACL, ceramic particles may be coated with a wax-based material and communicated through a screen for application to the containers. In an additional example, where the reference features are integral with the containers, such as, the container bottom outer profiles, the reference features are formed during molding. In yet another example, where the reference features are integral with the particle patterns, the reference features are applied when the particle patterns are applied, as discussed below.

Also at any suitable point(s) in the manufacturing process, the containers are coded. The coding step includes applying particles to the containers, or to the blanks, to mark the containers, or the blanks, when the containers, or the blanks, are hot enough and, thus, soft enough, for good bonding of the particles thereto. In general, the particles may be applied, for example, by blowing, blasting, spraying, dropping, sprinkling, or rolling the particles onto the blanks or containers, or by dipping, rolling, or setting the containers into or on the particles, or in any other suitable manner. The particles may be applied to one or more of the base, body, shoulder, or neck of the container. In one embodiment, the particles are selectively applied to only a portion of the container, for example, only to the base, body, shoulder, or neck. In another embodiment, the particles are selectively applied to overlap two portions of the container, for example, the body and the shoulder.

The particles are applied so that the particles penetrate, not merely coat, corresponding surfaces of the container. Also, glass frit particles may change shape and/or size once the particles penetrate into hot surfaces of the container. Likewise, the glass frit particles may further change shape, size, and/or position in the container surface during annealing. Such changes may further enhance randomness of the particle patterns.

In one example, particles may be applied to the blanks between the blank molds and the blow molds. For instance, the particles may be selectively applied onto the bases of the blanks as they are inverted from the blank molds to the blow molds of the forming machines.

In another example, particles may be applied to the containers downstream of the blow molds. For instance, particles may be selectively applied onto the bases, bodies, shoulders, and/or necks as the containers are picked up from the blow molds and placed onto a conveyor, or after the containers have been placed on the conveyor.

In a further example, particles may be applied to the containers in the annealing lehr. For instance, particles may be sprayed onto the containers in an upstream end of the lehr while the containers are still hot enough for good bonding with the particles.

In an additional example, the particles may be applied to the containers between the blow molds and the annealing lehr. For instance, as the containers travel on conveyors, or other material handling equipment, particles may be dumped or sprinkled onto the containers under the force of gravity, or by allowing the containers to pass by or over the particles. For example, the particles may be sprinkled on the conveyor on which the containers are placed after forming, or the particles may be rolled onto the containers by rollers carrying the particles, or by rolling the containers over material handling surfaces carrying the particles.

With any of the examples, any suitable equipment may be used including, for instance, pneumatic systems and nozzles, shot blasting equipment, ACL equipment, overhead hoppers with trap doors, overhead shakers, or the like, with or without chutes, masks, guides, or the like between the equipment and the containers. Any suitable particle recovery and recycling equipment also may be used to reuse particles that do not stick to the containers.

In any embodiment, the particles may penetrate, and become embedded in, the corresponding wall surfaces of the containers so that the particles cannot be removed without destroying or damaging the container, such that the particles are non-removable to serve as a marker that is resistant to tampering therewith. Accordingly, separate bar code labels, spray painting, or the like need not be applied to the containers. Bar code labels and the like may be easily tampered with, add significant cost to the process, and may detract from a brand appeal of a product.

In one embodiment, the coding step may include applying the particles to the containers with reference or respect to the code reference features, which may have been formed during the forming step. For example, at least some of the particles may be applied within a geometric outline of the reference features, more specifically, within embossed or debossed circles, squares, or any other suitable shapes. In another example, the particles may be applied around and/or over a geometric figure embossed or debossed in the container.

In another embodiment, the coding step may include applying the particles to the insides of the containers, for instance, against inside wall surfaces of the container bases. For example, the particles may be blown through nozzles that may be inserted into the containers after they leave the blow molds, for instance, as the containers travel along material handling equipment to the lehr, and/or in the lehr itself.

The particle patterns, with or without combination with the reference features, provide a unique and random coding scheme for the containers, wherein each container has a unique and random code. One or more of the different colors, different sizes, different shapes, different configurations, and/or randomness inherent in the particle application process establish unique and random particle patterns on the containers.

The coding step also may include optically reading the particle patterns. More specifically, the coding step may include capturing images of the applied patterns and associating the applied patterns with the containers. For example, one or more imaging devices may be used to capture images of the particle patterns, for example, immediately after the particle patterns are applied, or during inspection of the containers, or in any other suitable location in the container manufacturing process. The images may be associated with the containers in any suitable manner, for instance, by storing data for the images in a production database that may include the particle pattern images of corresponding containers, as well as unique identification numbers for the containers, production date and time, mold identification, and the like. Accordingly, each sequential pattern can establish a serial code for its corresponding container, such that the containers may be serialized.

After coding, the particle patterns can be analyzed in any suitable manner. For example, a code analyzer may be used to read a pattern from a container, process the particle pattern in conjunction with stored data, verify authenticity or origination of the container and/or obtain information about the container or product associated with the pattern. The code analyzer can include any suitable apparatus that may include an image capturing device, a controller, power supply, communications hardware, and other suitable hardware and software. For example, the code analyzer may include any suitable apparatus having a camera, processor, memory, battery, wired and/or wireless communications hardware, pattern recognition application, and the like. The code analyzer may be in communication with a computer network, for example, a company intranet, the Internet, or any other suitable computer network. Accordingly, the code analyzer may include an industrial imaging and computing apparatus, a smart phone with a camera, or any other suitable computing device.

In use, a container manufacturer can use the code analyzer to analyze the particle pattern on a container and store information about the container in conjunction with the analyzed pattern as a record in the production database or the like for later retrieval. More specifically, the container manufacturer may use the code analyzer to activate the pattern recognition application, aim the camera at the particle pattern, frame the particle pattern reference feature using any suitable cross-hairs, frame overlay, or the like of the camera and/or pattern recognition application, and acquire a corresponding image. The application may recognize the particle pattern by cross-referencing the acquired image against the database in any suitable manner, and data can be added to the database in associate with the container. Likewise, a beverage manufacturer can use a code analyzer to capture the particle pattern for a given container, upload the captured particle pattern to the production database for cross-referencing therewith, download information about the container, and upload information about a product with which the container is filled to the production database. Similarly, a distributor, retailer, consumer, or the like can use a code analyzer to capture the particle pattern for a given container, upload the captured particle pattern to the production database for cross-referencing therewith, and download information about the container and/or the product contained therein. Accordingly, the container manufacturer, beverage manufacturer, distributor, retailer, consumer, or the like can obtain information about the container and/or the product contained therein.

Accordingly, the particle patterns can be used throughout a distribution and supply chain for container or product tracking and tracing, and/or authenticity verification of the container and/or the product contained within the container. For example, a variety of attributes can be verified or added during the product cycle, for instance, the date and/or location of manufacture of the container and/or the product contained within the container, authenticity of the container and/or the product therein, and the like. In another example, an end consumer's use could trigger an "original/authentic product used" feature for the code associated with the container so that any subsequent uses would reveal a non-authentic or counterfeit product. For instance, when a container bearing a particle code is purchased, a retailer may use a point of sale (POS) system to scan or otherwise read the code and cross-reference and update the production database (or other database) to indicate that the particular container has been sold to a customer. Thereafter, if the container is ever repackaged and resold, the point of sale system can be used to indicate that the container has already been sold. For example, the POS system can read the code of the repackaged container and cross-reference the database, at which point, the POS system will discover that the database has already been updated with the previous sale and the POS system can issue an alert, prevent the sale, or the like, in any suitable manner. In effect, the code can be used to provide a chain of custody for the container to thwart unauthorized reuse or counterfeiting thereof.

There thus has been disclosed a container and methods of marking and manufacturing containers, that fully satisfy all of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the presently disclosed container and method have been discussed in terms of a glass composition and glass container manufacturing process, but the disclosure likewise applies to plastic and plastic container manufacturing. The disclosure is intended to embrace all such modifications and variations as fall within the spirit and broad scope of the appended claims.

The invention claimed is:

1. A method of manufacturing glass containers which includes the steps of:
   (a) producing a glass melt;
   (b) forming glass containers from the glass melt;
   (c) coding the glass containers by selectively applying a random pattern of discrete particles to a portion of each of the glass containers while the containers are at a sufficient temperature for the particles to bond with the containers and provide each of the containers with a unique optically readable code; and
   (d) annealing the glass containers.

2. The method set forth in claim 1 wherein the particles are different colors.

3. The method set forth in claim 1 wherein the forming step (b) includes the sub-steps of:
   (b1) forming blanks from the glass melt; and then
   (b2) forming the glass containers from the blanks, and wherein the random pattern of discrete particles is applied to the blanks between the forming steps (b1) and (b2) and at a temperature in the range of 900-1100 degrees Celsius.

4. The method set forth in claim 1 wherein the random pattern of discrete particles is applied to the glass containers after the forming step (b) but before the annealing step (d) and at a temperature in the range of 700-900 degrees Celsius.

5. The method set forth in claim 1 wherein the random pattern of discrete particles is applied to the glass containers during the annealing step (d).

6. The method set forth in claim 1 wherein the random pattern of discrete particles is applied to base walls of the glass containers.

7. The method set forth in claim 1 wherein the forming step (b) includes forming code reference features on the glass containers, and the random pattern of discrete particles is applied to the glass containers with respect to the code reference features.

8. The method set forth in claim 7 wherein the code reference features include geometric outlines and the random pattern of discrete particles is applied to the glass containers within the geometric outlines of the code reference features.

9. The method set forth in claim 8 wherein the geometric outlines include embossments or debossments in the glass containers.

10. The method set forth in claim 7 wherein the code reference features include outlines and the random pattern of discrete particles is applied to each of the glass containers such that some of the discrete particles are applied inside the outlines of the code reference features and some of the discrete particles are applied outside the outlines of the code reference features.

11. The method set forth in claim 1 wherein the random pattern of discrete particles is applied to the containers by rolling the particles onto the containers, or by dipping, rolling, or setting the containers into or on the particles.

12. The method set forth in claim 1 wherein the coding step (c) includes embedding the particles in walls of the glass containers such that the particles are non-removable from the glass containers.

13. The method set forth in claim 1 wherein the random pattern of discrete particles is applied to the glass containers while the containers are at a temperature in the range of 700-1100 degrees Celsius.

14. The method set forth in claim 1 wherein the random pattern of discrete particles is selectively applied to a base, body, shoulder, or neck portion of each of the glass containers.

15. The method set forth in claim 1 wherein step (c) includes selectively applying a random pattern of 20-353 discrete particles to a portion of each of the glass containers.

16. A method of marking a container for tracking or other purposes, which includes selectively applying a random pattern of discrete particles to a surface of a portion of the container such that the particles penetrate the surface and become embedded in the container to form a readable random code in the container.

17. The method set forth in claim 16 wherein the readable random code comprises a color pattern.

18. The method set forth in claim 16 wherein said surface is an inside surface of the container.

19. The method set forth in claim 16 including the additional step of providing at least one reference feature on the container as a reference for reading the code.

20. The method set forth in claim 19 wherein said at least one reference feature comprises a geometric shape on an inside or outside surface of the container.

21. The method set forth in claim 16 wherein the container is formed from soda-lime-silica glass, the discrete particles comprise soda-lime-silica glass, and the random pattern of discrete particles is applied to the container while the container is at a temperature in the range of 700-1100 degrees Celsius.

22. The method set forth in claim 16 wherein the container is formed by delivering a gob of molten glass to an individual section machine that includes a blank mold and a blow mold, and the random pattern of discrete particles is applied to the container during formation thereof.

23. The method set forth in claim 16 wherein the container is formed by delivering a gob of molten glass to an individual section machine that includes a blank mold and a blow mold, and the random pattern of discrete particles is applied to the container after formation, but before the container is annealed or while the container is being annealed.

24. The method set forth in claim 16 wherein the random pattern of discrete particles is applied to the surface of the container while the container is at a temperature in the range of 700-1100 degrees Celsius.

25. The method set forth in claim 16 wherein the container is formed by an individual section machine that includes a blank mold and a blow mold, and an embossed or debossed reference feature is produced on the surface of the container during formation thereof.

26. The method set forth in claim 25 wherein the random pattern of discrete particles is applied to the surface of the container within a geometric outline of the embossed or debossed reference feature.

27. A method of coding a glass container which includes the steps of:
   (a) forming a glass container from a gob of molten glass;
   (b) forming an optically readable code in a portion of the glass container by selectively applying a random pattern of discrete particles to a surface of the portion of the glass container while the glass container is at a sufficient temperature for the particles to penetrate the surface and bond with the glass container; and
   (c) reading the optically readable code in the glass container and associating the optically readable code with the glass container.

28. The method set forth in claim 27 wherein the forming step (b) includes forming a reference feature on the glass container, and the reading step (c) includes using the reference feature on the glass container as a reference for reading the optically readable code.

29. The method set forth in claim 27 wherein the reading step (c) includes capturing an image of the optically readable code in the glass container and storing data for the image in a database.

* * * * *